United States Patent
Mallik

(10) Patent No.: US 11,685,280 B2
(45) Date of Patent: Jun. 27, 2023

(54) SYSTEM AND METHOD FOR OUTPUT BUS SWITCHING TO ENHANCE EFFICIENCY IN WIDE OUTPUT LLC CONVERTER FOR EV CHARGING

(71) Applicant: STMicroelectronics International N.V., Geneva (CH)

(72) Inventor: Ranajay Mallik, Ghaziabad (IN)

(73) Assignee: STMicroelectronics International N.V., Geneva (CH)

( * ) Notice: Subject to any disclaimer, the term of this patent is extended or adjusted under 35 U.S.C. 154(b) by 254 days.

(21) Appl. No.: 17/175,143

(22) Filed: Feb. 12, 2021

(65) Prior Publication Data
US 2022/0258633 A1 Aug. 18, 2022

(51) Int. Cl.
*B60L 53/62* (2019.01)
*H02M 3/335* (2006.01)

(52) U.S. Cl.
CPC ......... *B60L 53/62* (2019.02); *H02M 3/33576* (2013.01); *B60L 2210/10* (2013.01)

(58) Field of Classification Search
CPC ............... B60L 53/62; B60L 2210/10; H02M 3/33576; H02M 1/0048; H02M 3/33573; H02M 3/01; H02M 3/3353; H02J 7/02; H02J 7/00032; H02J 2207/20

USPC ......................................................... 320/107
See application file for complete search history.

(56) References Cited

U.S. PATENT DOCUMENTS

2019/0241088 A1* 8/2019 Kimura ................... B60L 53/62
2021/0408889 A1* 12/2021 Zhu ........................ B60L 53/22

* cited by examiner

*Primary Examiner* — Paul Dinh
(74) *Attorney, Agent, or Firm* — Crowe & Dunlevy

(57) ABSTRACT

A DC-DC converter includes an inverter converting a DC supply voltage to a time varying signal. A transformer has a primary winding coupled to the inverter through an LC-tank circuit. A diode structure includes a first diode pair coupled in series between a high-voltage bus and a negative output, and a second diode pair coupled in series between the high-voltage bus and the negative output. The transformer has a secondary winding with a first terminal coupled to a tap between the first diode pair and a second terminal coupled to a tap between the second diode pair. A high-voltage bus transistor selectively couples the high-voltage bus to a positive output in response to a high-voltage bus gate drive signal. A low-voltage bus transistor selectively couples a low-voltage bus at a center tap of the secondary winding to the positive output in response to a low-voltage bus gate drive signal.

21 Claims, 6 Drawing Sheets

SYSTEM AND METHOD FOR OUTPUT BUS SWITCHING TO ENHANCE EFFICIENCY IN WIDE OUTPUT LLC CONVERTER FOR EV CHARGING

TECHNICAL FIELD

This disclosure is related to the field of LLC resonant converters and, in particular, to a modified LLC resonant converter providing for enhanced efficiency over a wide range of voltages by switching between two separate output busses.

BACKGROUND

An LLC resonant converter is a resonant inverter with three reactive elements which utilizes a switch network arranged as a half-bridge or a full-bridge to convert a DC input voltage to a square wave. This square wave is in turn fed to a resonant LLC tank that effectively filters out harmonics to provide a sinusoidal-like voltage and current output waveform. This waveform in turn is fed to an isolation transformer that provides voltage scaling. The power flow is controlled by modulating the square wave frequency with respect to the tank circuit's resonance.

One use for LLC resonant converters is in chargers for electric vehicles (EVs). This presents an issue because, while EV chargers may have a wide output range (e.g., 200V to 500V), LLC resonant converters operate at high efficiency when at, or close to, resonance. This means that during many output voltage scenarios, an LLC resonant converter may not be operating at high efficiency. For example, when an LLC resonant converter is operating at a lower voltage than its optimal efficiency is designed for, its operating frequency is raised significantly above the resonance of the tank circuit to achieve regulation, which sacrifices efficiency. Similarly, when an LLC resonant converter is operating at a higher voltage than its optimal efficiency is designed for, its operating frequency is lowered significantly below the resonance of the tank circuit to achieve regulation, which also sacrifices efficiency.

As such, further development into the area of LLC resonant converters is needed, in particular to provide for high efficiency over a wide range of operating voltages.

SUMMARY

Disclosed herein is a DC-DC converter, comprising: an inverter coupled between a DC supply voltage and ground, and configured to convert the DC supply voltage to a time varying signal, the inverter being controlled by at least one inverter control signal; a transformer having a primary winding coupled to the inverter through an LC tank circuit to receive the time varying signal; a diode structure comprising a first diode pair coupled in series between a high-voltage bus and a negative output, and a second diode pair coupled in series between the high-voltage bus and the negative output; wherein the transformer has a secondary winding having a first terminal coupled to a tap between the first diode pair and a second terminal coupled to a tap between the second diode pair; a high-voltage bus transistor selectively coupling the high-voltage bus to a positive output in response to a high-voltage bus gate drive signal; and a low-voltage bus transistor selectively coupling a low-voltage bus at a center tap of the secondary winding to the positive output in response to a low-voltage bus gate drive signal.

A microcontroller may receive a feedback signal indicative of an output voltage formed between the positive output and the negative output, the microcontroller causing assertion of the high-voltage bus gate drive signal in response to the output voltage being above a threshold, deassertion of the high-voltage bus gate drive signal in response to the output voltage being below the threshold, assertion of the low-voltage bus gate drive signal in response to the output voltage being below the threshold, and deassertion of the low-voltage bus gate drive signal in response to the output voltage being above the threshold.

The microcontroller may be further configured to generate the at least one inverter control signal so as to operate the inverter in a first mode in response to the output voltage being above the threshold and operate the inverter in a second mode in response to the output voltage being below the threshold.

The inverter may be a full-bridge inverter, the full-bridge inverter formed of a first pair of series-connected transistors coupled between the DC supply voltage and ground and a second pair of series-connected transistors coupled between the DC supply voltage and ground.

The LC tank circuit may be formed of a capacitor coupled between a center tap between the second pair of series-connected transistors and a first terminal of the primary winding, and an inductor coupled between a center tap between the first pair of series-connected transistors and a second terminal of the primary winding.

The high-voltage bus transistor may be a first n-channel transistor having a drain coupled to the high-voltage bus, a source coupled to the positive output, and a gate coupled to receive the high-voltage bus gate drive signal.

The low-voltage bus transistor may be a second n-channel transistor having a drain coupled to the low-voltage bus, a source coupled to the positive output, and a gate coupled to receive the low-voltage bus gate drive signal.

The output voltage may be configured to charge a load device.

The load device may be an electronic vehicle.

The diode structure may be configured to operate as a bridge rectifier when the high-voltage bus is coupled to the positive output, and to operate as a full wave rectifier when the low-voltage bus is coupled to the positive output.

The transformer and LC tank may be designed so as to operate at resonance when the feedback signal indicative of the output voltage formed between the positive output and the negative output is equal to the threshold.

The microcontroller may be configured to cause assertion of the high-voltage bus gate drive signal by generating a first pulse width modulation signal. A high-voltage bus gate drive signal generation circuit may include a first rectifier configured to rectify the first pulse width modulation signal to produce a first voltage, and a first gate driver configured to assert the high-voltage bus gate drive signal based upon the first voltage.

The microcontroller may be configured to cause assertion of the low-voltage bus gate drive signal by generating a second pulse width modulation signal. A low-voltage bus gate drive signal generation circuit may include a second rectifier configured to rectify the second pulse width modulation signal to produce a second voltage, and a second gate driver may be configured to assert the low-voltage bus gate drive signal based upon the second voltage.

Also disclosed herein is a method including: converting a DC supply voltage to a time varying signal; coupling the time varying signal to a primary winding of a transformer through an LC tank to thereby induce a current in a secondary winding of the transformer; connecting a load battery across an output sense resistance coupled between positive and negative outputs; determining a voltage of the load battery based upon a voltage on the output sense resistance; connecting a low-voltage bus to the secondary winding of the transformer and to the positive output if the voltage of the load battery is below a threshold voltage; and connecting a high-voltage bus to the secondary winding of the transformer and to the positive output if the voltage of the load battery is above the threshold voltage.

The low-voltage bus may be connected to the positive output by connecting a center tap of the secondary winding of the transformer to the positive output.

The high-voltage bus may be connected to the positive output by connecting a first end terminal of the secondary winding to the positive output through a first diode and connecting a second end terminal of the secondary winding to the negative output through a second diode.

The time varying signal may increase in frequency as the voltage of the load battery drops, and the time varying signal may decrease in frequency as the voltage of the load battery increases.

Also disclosed herein is a method including: converting a DC supply voltage to a time varying signal; coupling the time varying signal to a primary winding of a transformer through an LC tank to thereby induce a time varying current in a secondary winding of the transformer; connecting the time varying current to a diode circuit in a fashion to configure the diode circuit to be a full-bridge rectifier that produces a rectified current provided to a high-voltage bus connected to a positive output, if the voltage of a load battery coupled between the positive output and a negative output is above a threshold voltage; and connecting the time varying current to the diode circuit in a fashion to configure the diode circuit to be a full-wave rectifier that produces a rectified current provided to a low-voltage bus connected to the positive output, if the voltage of the load battery coupled between the positive output and the negative output is below the threshold voltage.

The low-voltage bus may be connected to the positive output by connecting a center tap of the secondary winding of the transformer to the positive output.

The high-voltage bus may be connected to the positive output by connecting a first end terminal of the secondary winding to the positive output through a first diode and connecting a second end terminal of the secondary winding to the negative output through a second diode.

The time varying signal may increase in frequency as the voltage of the load battery drops, and the time varying signal may decrease in frequency as the voltage of the load battery increases.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
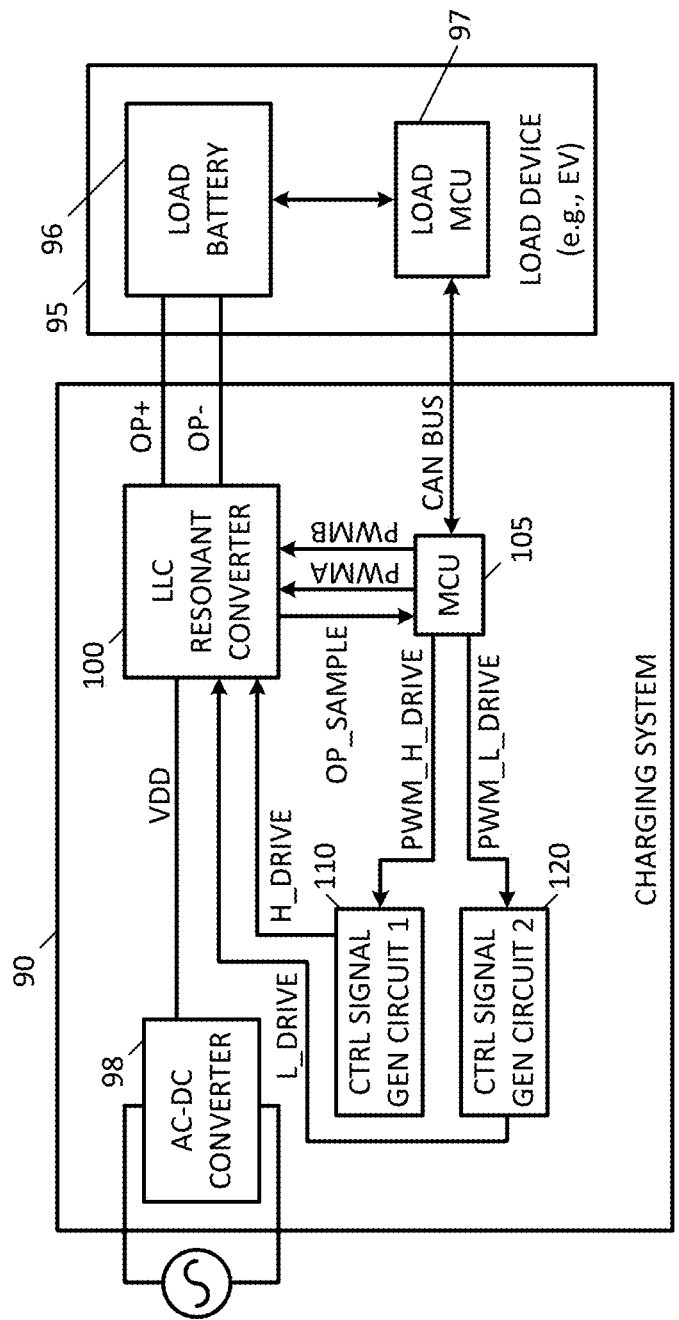
FIG. 1 is a block diagram of a charging system and a load device being charged by the charging system, with the charging system being disclosed herein.

With reference to FIG. 1, a charging system 90 for a load device 95 (for example, an electronic vehicle with a battery that, at maximum charge, is around 550 V, and when discharged, is around 350 V) is now described. The charging system 90 includes an AC-DC converter 98 that receives power over AC mains, and converts it to a DC supply voltage VDD. The LLC resonant converter 100 is a DC-DC converter that coverts the DC supply voltage to an output signal sent to the load device 95 through positive and negative leads, OP+ and OP−, respectively. The LLC resonant converter 100 has its DC-DC conversion controlled by control signals PWMA and PWMB from a microcontroller 105. As will be explained below, the voltage at the positive lead OP+ is provided over either a high-voltage bus BUS_HI or a low-voltage bus BUS_LOW, but not over both buses at once (i.e., simultaneously), based upon control signals H_DRIVE and L_DRIVE respectively received from control signal generation circuits 110 and 120. The control signal generation circuits 110 and 120 are powered by PWM signals PWM_H_DRIVE and PWM_L_DRIVE received from the microcontroller 105.

The load device 95 has a battery 96 that is charged by the output voltage from the OP+ and OP− leads. The load device 95 also has a microcontroller (which may be referred to as a battery monitoring system) 97 that monitors the load battery 96, and communicates with the microcontroller 105 of the charging system 90 over a bus, such as a controller area network bus (CAN bus). The microcontroller 97 may, for example, communicate information about the load battery 96 to the LLC resonant converter 100 over the CAN BUS, this information being static information such as the full charge voltage, full discharge voltage, and current requirement of the load battery 96, as well as potentially dynamic information about the battery such as the current charge state, battery temperature, etc.

Figure 2:
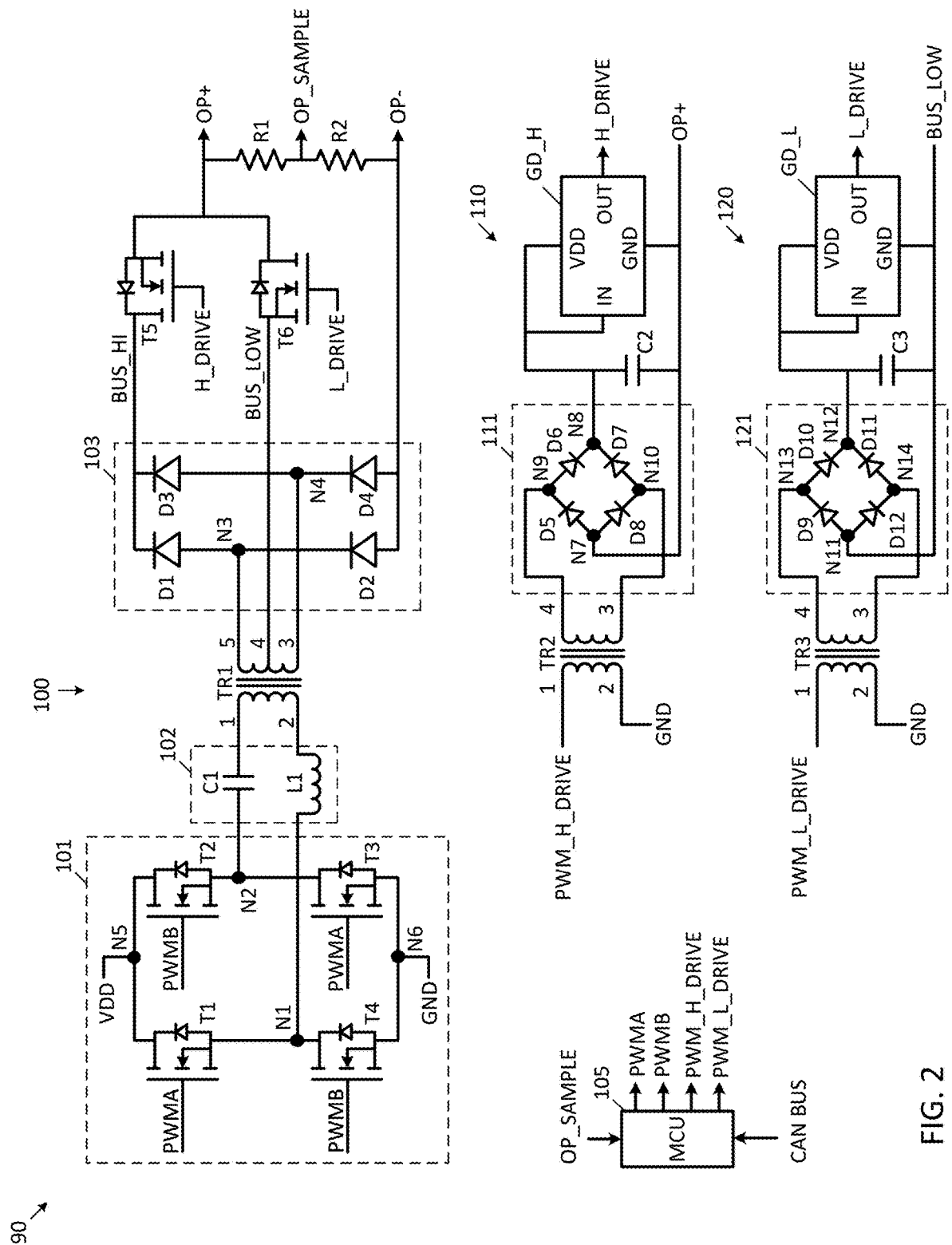
FIG. 2 is a detailed schematic diagram of the charging system of FIG. 1.

Now described with reference to FIG. 2 are the specifics of the charging system 90. The LLC resonant converter 100 includes an inverter 101 that is powered between the DC supply voltage VDD and ground GND. The inverter 101 is comprised of: a first n-channel transistor T1 having its drain coupled to VDD at node N5, its source coupled to node N1, and its gate coupled to receive the control signal PWMA; a second n-channel transistor T2 having its drain coupled to VDD at node N5, its source coupled to node N2, and its gate coupled to receive the control signal PWMB; a third n-channel transistor T3 having its drain coupled to the source of transistor T2 at node N2, its source coupled to ground at node N6, and its gate coupled to receive the control signal PWMA; and a fourth n-channel transistor T4 having its drain coupled to the source of transistor T1 at node N1, its source coupled to ground at node N6, and its gate coupled to receive the control signal PWMB.

A resonant tank 102 includes a capacitor C1 coupled between node N2 and a first transformer terminal 1 of the primary winding of a transistor TR1, and an inductor L1 coupled between node N1 and a second transformer terminal 2 of the secondary winding of the transistor TR1. The transformer TR1 has a secondary winding with three terminals, labeled as transformer terminals 3, 4, and 5, with terminal 4 being the center tap of the secondary winding. The design of the secondary winding of the transformer TR1 is therefore such that when output is obtained between the third transformer terminal 3 and the fifth transformer terminal 5, operation at resonance is at a high voltage, but when output is obtained between the third transformer terminal 3 and the fourth transformer terminal 4, operation at resonance is at a lower voltage.

A diode circuit 103 is coupled between a high voltage bus BUS_HI and a negative output OP−, and is comprised of: a diode D1 having its cathode coupled to high voltage bus BUS_HI and its anode coupled to node N3; a diode D2 having its cathode coupled to the anode of diode D1 at node N3 and its anode coupled to the negative output OP−; a diode D3 having its cathode coupled to the high voltage bus BUS_HI and its anode coupled to node N4; and a diode D4 having its cathode coupled to the anode of diode D3 at node N4 and its anode coupled to the negative output OP−. The secondary winding of the transformer TR1 has its third transformer terminal 3 coupled to node N4, and its fifth transformer terminal 5 coupled to node N3.

A transistor T5 has its drain coupled to the high-voltage bus BUS_HI, its source coupled to the positive output OP+, and its gate coupled to receive the control signal H_DRIVE.

The center tap of the secondary winding of the transformer TR1, which is the fourth transformer terminal 4, is coupled to the drain of n-channel transistor T6 to create the low-voltage bus BUS_LOW. The source of transistor T6 is coupled to the positive output OP+, and the gate of transistor T6 is coupled to receive the control signal L_DRIVE.

A voltage divider formed by resistors R1 and R2 is coupled between the positive output OP+ and the negative output OP−. A sense signal OP_SAMPLE representative of the voltage of the load battery 96 is formed at the tap between resistors R1 and R2.

The generation of the control signals H_DRIVE and L_DRIVE is now described. A first control signal generation circuit 110 generates the H_DRIVE control signal that turns on and off the transistor T5 to thereby activate or deactivate the high-voltage bus BUS_HI. The first control signal generation circuit 110 includes a transformer TR2 having a primary winding receiving a first pulse width modulation signal PWM_H_DRIVE from the microcontroller 105, and a secondary winding coupled to a full bridge rectifier circuit 111. The full bridge rectifier circuit 111 includes: a diode D5 having its cathode coupled to node N9 and its anode coupled to node N7; a diode D6 having its cathode coupled to node N8 and its anode coupled to node N9; a diode D7 having its cathode coupled to node N8 and its anode coupled to node N10; and a diode D8 having its cathode coupled to node N10 and its anode coupled to node N7. A third transformer terminal 3 of the secondary winding of the transformer TR2 is coupled to the node N10, and a fourth terminal 4 of the secondary winding of the transformer TR2 is coupled to the node N9. A tank capacitor C2 is coupled between node N8 and the positive output OP+. A gate driver GD_H has an input terminal coupled to node N8, a supply voltage terminal also coupled to node N8, a ground terminal coupled to the positive output OP+, and an output terminal generating the control signal H_DRIVE.

The gate driver GD_H may be any low side gate driver integrated circuit, or may instead be discretely realized using bipolar transistor or MOSFET transistors to provide a 12V bias for the gate of the transistor T5 with respect to the source of the transistor T5. This gate driver GD_H also has an undervoltage lock-out feature so that the transistor T5 does not operate out of its switching zone (e.g., does not operate in the linear region of operation).

A second control signal generation circuit 120 generates the L_DRIVE control signal that turns on and off the transistor T6 to thereby activate or deactivate the low-voltage bus BUS_LOW. The second control signal generation circuit 120 includes a transformer TR3 having a primary winding receiving a second pulse width modulation signal PWM_L_DRIVE from the microcontroller 105, and a secondary winding coupled to a full bridge rectifier circuit 121. The full bridge rectifier circuit 121 includes: a diode D9 having its cathode coupled to node N13 and its anode coupled to node N11; a diode D10 having its cathode coupled to node N12 and its anode coupled to node N13; a diode D11 having its cathode coupled to node N12 and its anode coupled to node N14; and a diode D12 having its cathode coupled to node N14 and its anode coupled to node N11. A third transformer terminal 3 of the secondary winding of the transformer TR3 is coupled to the node N14, and a fourth terminal 4 of the secondary winding of the transformer TR3 is coupled to the node N13. A tank capacitor C3 is coupled between node N12 and the positive output OP+. A gate driver GD_L has an input terminal coupled to node N12, a supply voltage terminal also coupled to node N12, a ground terminal coupled to thelow-voltage bus BUS_LOW, and an output terminal generating the control signal L_DRIVE.

The gate driver GD_L may be any low side gate driver integrated circuit, or may instead be discretely realized using bipolar transistor or MOSFET transistors to provide a 12V bias for the gate of the transistor T6 with respect to the source of the transistor T6. This gate driver GD_L also has an undervoltage lock-out feature so that the transistor T6 does not operate out of its switching zone (e.g., does not operate in the linear region of operation).

The microcontroller 105 receives the sense signal OP_SAMPLE, and samples it. From the value of OP_SAMPLE, the microcontroller 105 generates the control signals PWMA and PWMB for the inverter 101.

In general, operation of the LLC resonant converter 100 operates by disabling the high-voltage bus BUS_HI and enabling the low-voltage bus BUS_LOW, thereby operating the diodes D2 and D4 of the diode structure 103 as a full-wave rectifier (e.g., two operational diodes with a transformer center tap), when operating at or below a desired midpoint voltage (for example, 350V) of the voltage range the LLC resonant converter 100 is intended to cover (for example, 200V to 500V), and by enabling the high-voltage bus BUS_HI and disabling the low-voltage bus BUS_LOW, thereby operating the diodes D1-D4 of the diode structure 103 as a full-bridge (e.g., four operational diodes and no transformer center tap), when operating above the desired midpoint voltage. Since the output voltage at the fourth transformer terminal 4 is less than the output voltage at the fifth transformer terminal 5, by switching between the low-voltage bus BUS_LOW and high-voltage bus BUS_HI, operation of the LLC resonant converter 100 may be at or close to resonance over a wide range of voltages.

Detailed operation of the LLC resonant converter 100 to charge the load 95 will now be described. Initially, before the load (for example, an electronic vehicle) is connected, the MCU 105 is aware that no load is connected due to a lack of information received from the load over the CAN BUS. Therefore, PWM_H_DRIVE and PWM_L_DRIVE are switched off by the MCU 105, so that the control signals H_DRIVE and L_DRIVE are pulled low by the control signal generation circuits 110 and 120, meaning that both transistors T5 and T6 are off, disabling both the high-voltage bus BUS_HI and the low-voltage bus BUS_LOW. When the load is then connected between the positive output OP+ and the negative output OP−, the battery voltage is sampled at OP_SAMPLE by the MCU 105. As explained, the load has a battery monitoring system (microcontroller 97) which communicates with the MCU 105 over the CAN BUS, and provides the information about the load to the MCU 105, such as the full charge voltage, full discharge voltage, and current requirement of the load. With this being determined, the MCU 105 uses the value of OP_SAMPLE to locate within a lookup table whether it should activate the high-voltage bus BUS_HI or the low-voltage bus BUS_LOW to begin charging.

If the value of OP_SAMPLE is less than a threshold voltage (e.g., the midpoint voltage, such as 350 V, which is the resonance point), then the result from the lookup table is for the MCU 105 to produce PWM_L_DRIVE so that L_DRIVE is asserted by the gate driver GD_L to turn on transistor T6 and therefore the low-voltage bus BUS_LOW. If the value of OP_SAMPLE is greater than the threshold voltage, then the result from the lookup table is for the MCU 105 to produce PWM_H_DRIVE so that H_DRIVE is asserted by the gate driver GD_H to turn on transistor T5 and therefore the high-voltage bus BUS_HI.

Over the course of operation, the battery monitoring system 97 may communicate with the MCU 105 over the CAN BUS to inform the MCU 105 so as to instruct the MCU 105 to change the current provided to the load battery 96 (by adjusting PWMA and PWMB, and potentially switching between the low-voltage bus BUS_LOW and the high-voltage bus BUS_HI) according to a desired charging profile. The current to be provided to the load battery 96 may be changed, for example, depending upon the value of OP_SAMPLE.

Consider the case of a 425V load battery 96 that, as shown by the value of OP_SAMPLE, is fully discharged (which may be, for example, 325V). Therefore, the MCU 105 starts to charge the load battery 96 by activating the low-voltage bus BUS_LOW while keeping the high-voltage bus BUS_HI deactivated. As the load battery 96 begins to charge and its voltage (and therefore the value of OP_SAMPLE) rises to cross the threshold voltage (e.g., 350 V), the MCU 105 turns off the low-voltage bus BUS_LOW and turns on the high-voltage bus BUS_HI. Note that after crossing the threshold voltage, the value of OP_SAMPLE is still close to the threshold voltage, and therefore the LLC resonant converter 100 is still operating close to resonance and efficiently.

Do note that as the voltage of the load battery 96 as indicated by the value of OP_SAMPLE during charging increases above the threshold voltage (at which the LLC resonant converter 100 is at resonance), the frequency of the control signals PWMA and PWMB of the inverter 101 is decreased to thereby decrease the switching frequency of the inverter 101 to enable achievement of the requisite output voltage between OP+ and OP−. However, due to the design of the transformer TR1 and the use of the two buses, the frequency remains near resonance. Likewise, when the voltage of the load battery 96 as indicated by OP_SAMPLE during charging is below the threshold voltage, the frequency of the control signals PWMA and PWMB of the inverter 101 is increased to thereby increase the switching frequency of the inverter 101 to enable achievement of the requisite output voltage between OP+ and OP−. However, here too, due to the design of the transformer TR1 and the use of the two buses, the frequency remains near resonance.

When operating at a frequency lower than resonance (which can be referred to as operating at the left side of resonance), efficiency is still relatively high. However, when operating at a frequency higher than resonance (which can be referred to as operating at the right side of resonance), especially if much higher than resonance, efficiency is much less and losses are significantly higher. Therefore, it is preferable to operate below resonance than above resonance. As such, this is to be taken into account when designing the transformer TR1 and the tank 102.

Through these techniques, by switching between the high-voltage bus BUS_HI and the low-voltage bus BUS_LOW, an overall average increase in efficiency is achieved and therefore, a charging station implementing the LLC resonant converter 100 in its charging units has a lower cost of ownership than it would have if its charging units implemented other LLC resonant converters, as due to the gain in efficiency, the charging station will consume less power per vehicle charged.

Additional operation examples will now be given. Consider first the case of FIG. 3, where the load battery 96 is at a voltage of 520 V. This can be noticed because OP+ is at 520 V, and although not shown, is also reflected in the value of OP_SAMPLE. Due to the voltage of the load battery 96 being at this magnitude, the high-voltage bus BUS_HI is activated by transistor T5 being on and the low-voltage bus BUS_LO is deactivated by transistor T6 being off. Observe in FIG. 3 that the current through the tank 102 is nearly sinusoidal, meaning that the LLC converter 100 is operating at or close to resonance. Moreover, observe that the frequency of the square wave is about 85 kHz, which is a useful range for MOSFETs to be switching at, and provides for low magnetic losses.

Figure 4:
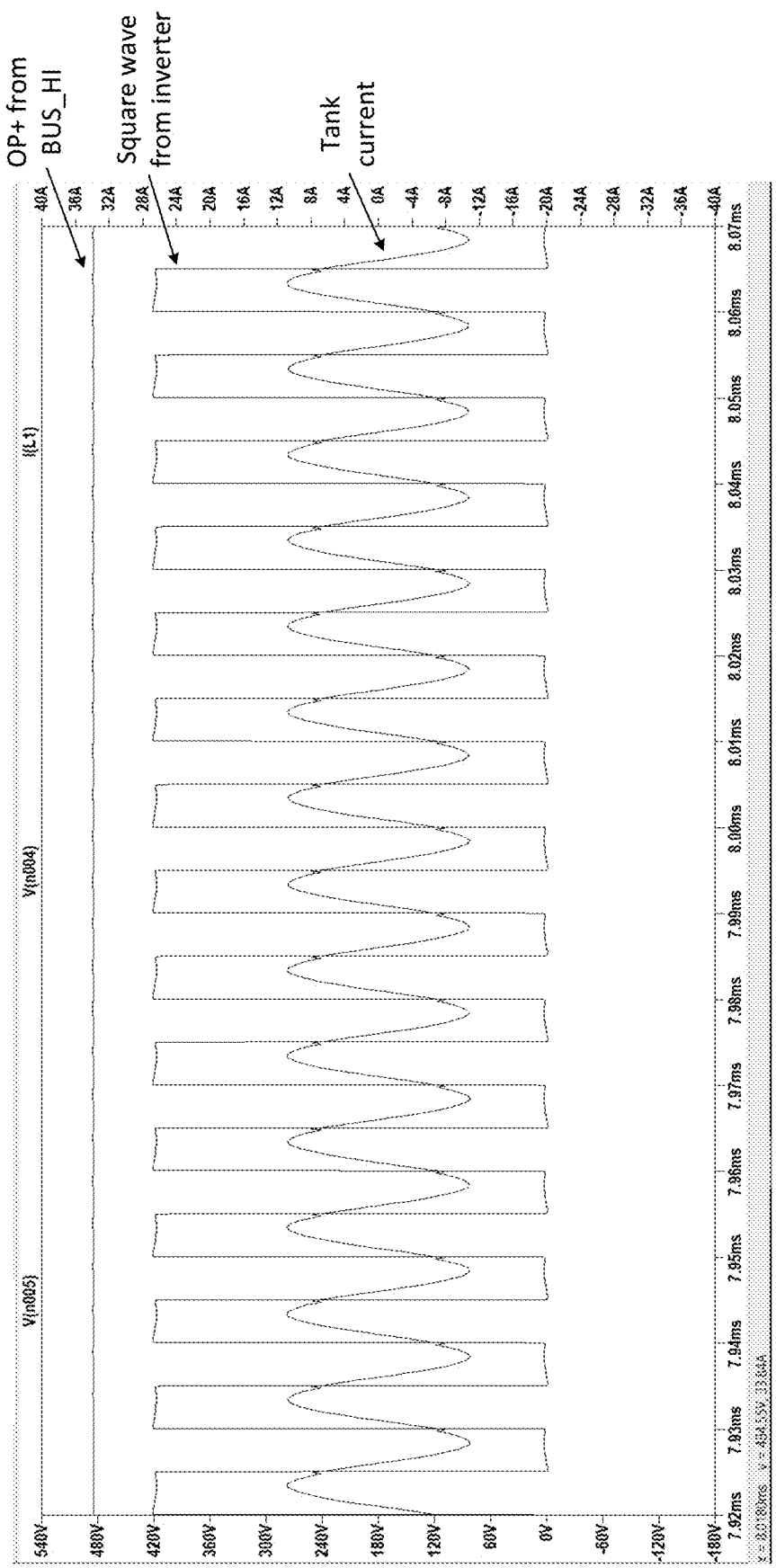
FIG. 4 is a graph showing voltages and currents of the charging system of FIG. 1 when in operation charging a battery at a second voltage.

Consider next the case of FIG. 4, where the load battery 96 is at a voltage of 480 V. This can be noticed because OP+ is at 480 V, and although not shown, is also reflected in the value of OP_SAMPLE. Due to the voltage of the load battery 96 being at this magnitude, the high-voltage bus BUS_HI is activated by transistor T5 being on and the low-voltage bus BUS_LO is deactivated by transistor T6 being off. Observe in FIG. 4 that the current through the tank 102 is nearly sinusoidal, meaning that the LLC converter 100 is operating at or close to resonance. Moreover, observe that the frequency of the square wave is about 85 kHz, which is a useful range for MOSFETs to be switching at, and provides for low magnetic losses.

Figure 5:
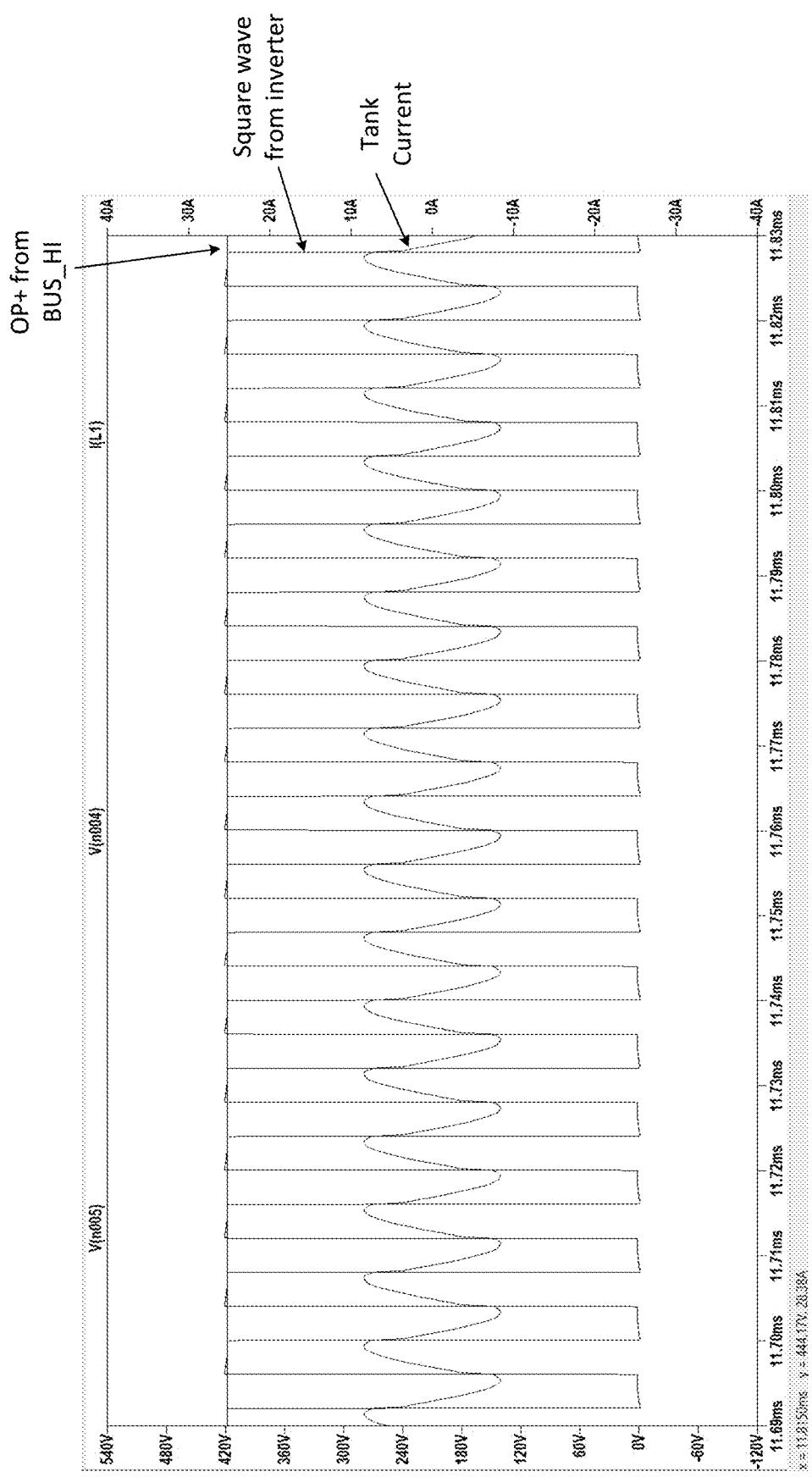
FIG. 5 is a graph showing voltages and currents of the charging system of FIG. 1 when in operation charging a battery at a third voltage.

Now consider the case of FIG. 5, where the load battery 96 is at a voltage of 420 V. This can be noticed because OP+ is at 420 V, and although not shown, is also reflected in the value of OP_SAMPLE. Due to the voltage of the load battery 96 being at this magnitude, the high-voltage bus BUS_HI is activated by transistor T5 being on and the low-voltage bus BUS_LO is deactivated by transistor T6 being off. Observe here that the current through the tank 102 is not sinusoidal, meaning that the LLC converter 100 is operating to the right of resonance, and therefore somewhat far from an preferred or ideal operating point. Observe that here the frequency of the square wave is about 110 kHz, also a useful range for MOSFETs to be switching at, also with low magnetic loss. However, in this range, diode losses are greater, but still within an acceptable range.

Figure 3:
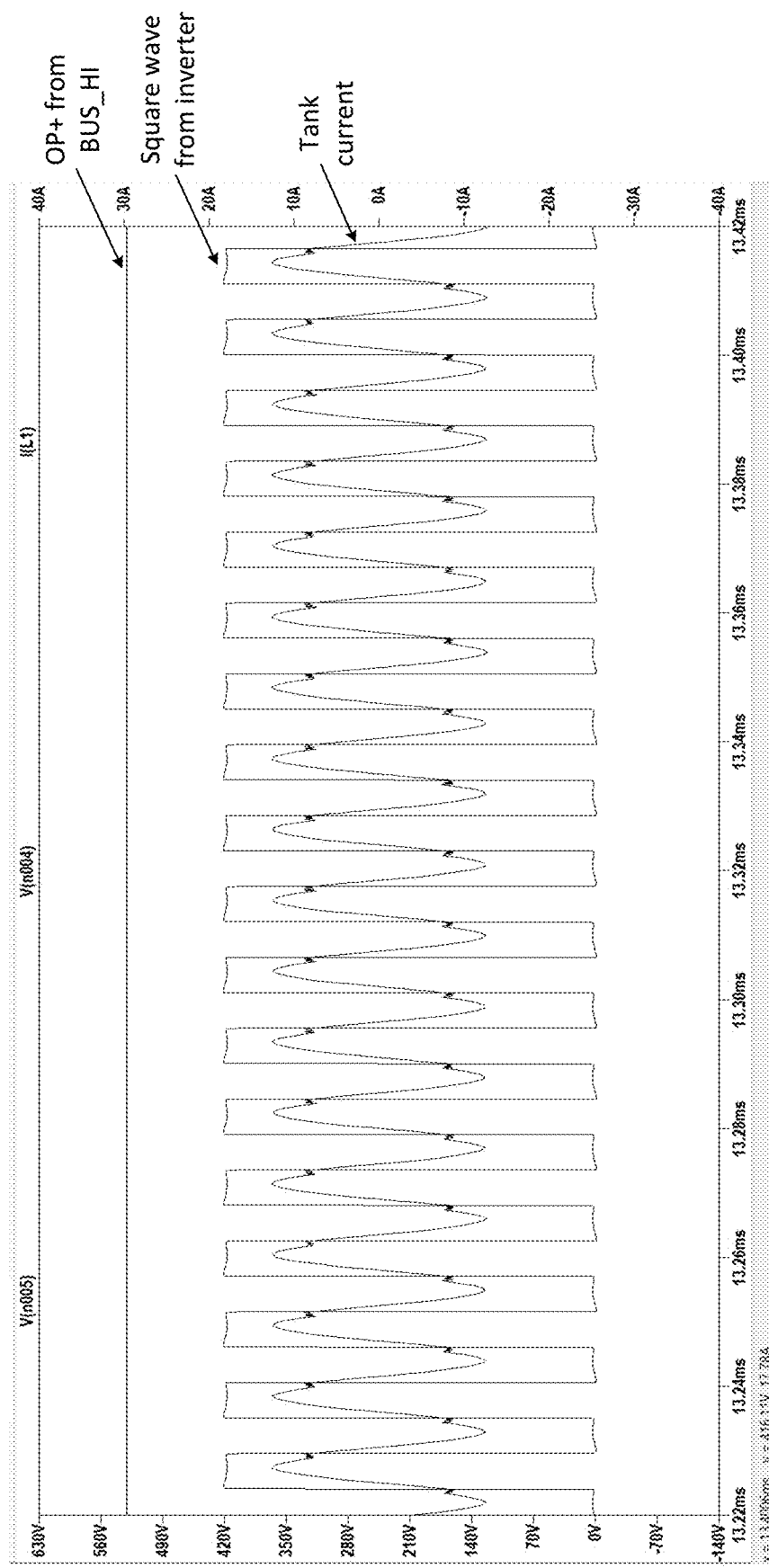
FIG. 3 is a graph showing voltages and currents of the charging system of FIG. 1 when in operation charging a battery at a first voltage.
Figure 6:
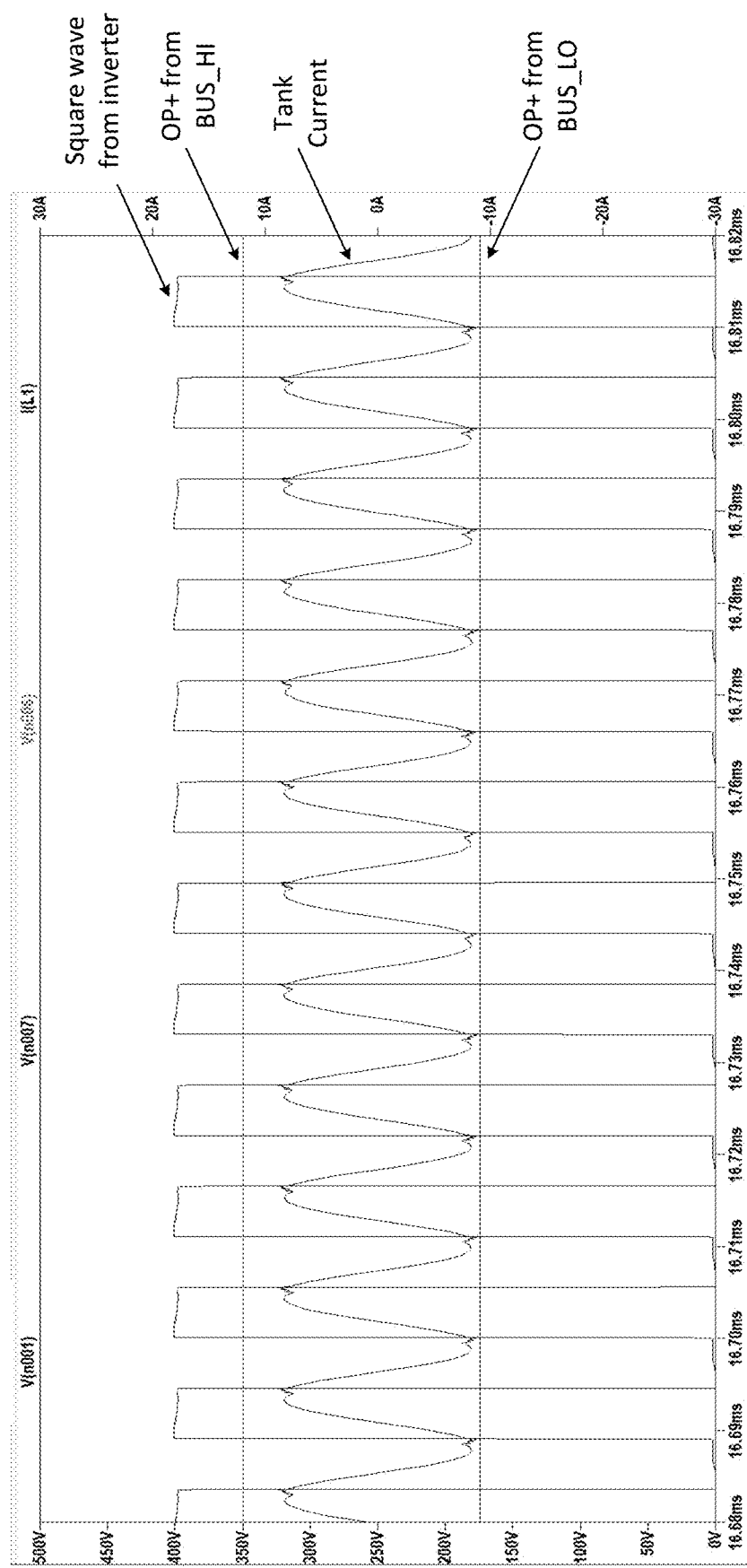
FIG. 6 is a graph showing voltages and currents of the charging system of FIG. 1 when in operation charging a battery at a fourth voltage.

Assume now that, as opposed to the above three cases of FIGS. 3-5, an electronic vehicle having a load battery 96 at a voltage of 175 V is connected to the charging system 90. As explained, this would otherwise result in the MCU 105 increasing the frequency of the square wave, resulting in greater losses, and inefficient system operation. However, through the use of the charging system 90, this is avoided. Refer therefore to FIG. 6. Here, the voltage OP+ on the high-voltage bus BUS_HI is illustrated as being present for reference, but is not actually present, because the low-voltage bus BUS_LO is activated by transistor T6 being on and while the high-voltage bus BUS_HI is activated by transistor T5 being off. Therefore, notice that the tank current is again sinusoidal, meaning that the LLC converter 100 is operating at or close to resonance, while charging the load battery 96 that is presently at 175 V. Therefore, as stated, regardless of battery voltage, the LLC converter 100 is operating near resonance and near peak efficiency.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A DC-DC converter, comprising:
   an inverter coupled between a DC supply voltage and ground, and configured to convert the DC supply voltage to a time varying signal, the inverter being controlled by at least one inverter control signal;
   a transformer having a primary winding coupled to the inverter through an LC tank circuit to receive the time varying signal;
   a diode structure comprising a first diode pair coupled in series between a high-voltage bus and a negative output, and a second diode pair coupled in series between the high-voltage bus and the negative output;
   wherein the transformer has a secondary winding having a first terminal coupled to a tap between the first diode pair and a second terminal coupled to a tap between the second diode pair;
   a high-voltage bus transistor selectively coupling the high-voltage bus to a positive output in response to a high-voltage bus gate drive signal; and
   a low-voltage bus transistor selectively coupling a low-voltage bus at a center tap of the secondary winding to the positive output in response to a low-voltage bus gate drive signal.

2. The DC-DC converter of claim 1, further comprising a microcontroller receiving a feedback signal indicative of an output voltage formed between the positive output and the negative output, the microcontroller causing assertion of the high-voltage bus gate drive signal in response to the output voltage being above a threshold, deassertion of the high-voltage bus gate drive signal in response to the output voltage being below the threshold, assertion of the low-voltage bus gate drive signal in response to the output voltage being below the threshold, and deassertion of the low-voltage bus gate drive signal in response to the output voltage being above the threshold.

3. The DC-DC converter of claim 2, wherein the microcontroller is further configured to generate the at least one inverter control signal so as to operate the inverter in a first mode in response to the output voltage being above the threshold and operate the inverter in a second mode in response to the output voltage being below the threshold.

4. The DC-DC converter of claim 1, wherein the inverter comprises a full-bridge inverter, the full-bridge inverter comprised of a first pair of series-connected transistors coupled between the DC supply voltage and ground and a second pair of series-connected transistors coupled between the DC supply voltage and ground.

5. The DC-DC converter of claim 4, wherein the LC tank circuit comprises a capacitor coupled between a center tap between the second pair of series-connected transistors and a first terminal of the primary winding, and an inductor coupled between a center tap between the first pair of series-connected transistors and a second terminal of the primary winding.

6. The DC-DC converter of claim 1, wherein the high-voltage bus transistor comprises a first n-channel transistor having a drain coupled to the high-voltage bus, a source coupled to the positive output, and a gate coupled to receive the high-voltage bus gate drive signal.

7. The DC-DC converter of claim 1, wherein the low-voltage bus transistor comprises a second n-channel transistor having a drain coupled to the low-voltage bus, a source coupled to the positive output, and a gate coupled to receive the low-voltage bus gate drive signal.

8. The DC-DC converter of claim 2, wherein the output voltage is configured to charge a load device.

9. The DC-DC converter of claim 8, wherein the load device is an electronic vehicle.

10. The DC-DC converter of claim 1, wherein the diode structure is configured to operate as a bridge rectifier when the high-voltage bus is coupled to the positive output, and to operate as a full wave rectifier when the low-voltage bus is coupled to the positive output.

11. The DC-DC converter of claim 2, wherein the transformer and LC tank are designed so as to operate at resonance when the feedback signal indicative of the output voltage formed between the positive output and the negative output is equal to the threshold.

12. The DC-DC converter of claim 2, wherein the microcontroller is configured to cause assertion of the high-voltage bus gate drive signal by generating a first pulse width modulation signal; and further comprising a high-voltage bus gate drive signal generation circuit including a first rectifier configured to rectify the first pulse width modulation signal to produce a first voltage, and a first gate driver configured to assert the high-voltage bus gate drive signal based upon the first voltage.

13. The DC-DC converter of claim 2, wherein the microcontroller is configured to cause assertion of the low-voltage bus gate drive signal by generating a second pulse width modulation signal; and further comprising a low-voltage bus gate drive signal generation circuit including a second rectifier configured to rectify the second pulse width modulation signal to produce a second voltage, and a second gate driver configured to assert the low-voltage bus gate drive signal based upon the second voltage.

14. A method, comprising:
   converting a DC supply voltage to a time varying signal;
   coupling the time varying signal to a primary winding of a transformer through an LC tank to thereby induce a current in a secondary winding of the transformer;
   connecting a load battery across an output sense resistance coupled between positive and negative outputs;
   determining a voltage of the load battery based upon a voltage on the output sense resistance;

connecting a low-voltage bus to the secondary winding of the transformer and to the positive output if the voltage of the load battery is below a threshold voltage; and connecting a high-voltage bus to the secondary winding of the transformer and to the positive output if the voltage of the load battery is above the threshold voltage.

15. The method of claim 14, wherein the low-voltage bus is connected to the positive output by connecting a center tap of the secondary winding of the transformer to the positive output.

16. The method of claim 14, wherein the high-voltage bus is connected to the positive output by connecting a first end terminal of the secondary winding to the positive output through a first diode and connecting a second end terminal of the secondary winding to the negative output through a second diode.

17. The method of claim 14, wherein the time varying signal increases in frequency as the voltage of the load battery drops, and the time varying signal decreases in frequency as the voltage of the load battery increases.

18. A method, comprising:

converting a DC supply voltage to a time varying signal;

coupling the time varying signal to a primary winding of a transformer through an LC tank to thereby induce a time varying current in a secondary winding of the transformer;

connecting the time varying current to a diode circuit in a fashion to configure the diode circuit to be a full-bridge rectifier that produces a rectified current provided to a high-voltage bus connected to a positive output, if a voltage of a load battery coupled between the positive output and a negative output is above a threshold voltage; and connecting the time varying current to the diode circuit in a fashion to configure the diode circuit to be a full-wave rectifier that produces a rectified current provided to a low-voltage bus connected to the positive output, if the voltage of the load battery coupled between the positive output and the negative output is below the threshold voltage.

19. The method of claim 18, wherein the low-voltage bus is connected to the positive output by connecting a center tap of the secondary winding of the transformer to the positive output.

20. The method of claim 18, wherein the high-voltage bus is connected to the positive output by connecting a first end terminal of the secondary winding to the positive output through a first diode and connecting a second end terminal of the secondary winding to the negative output through a second diode.

21. The method of claim 18, wherein the time varying signal increases in frequency as the voltage of the load battery drops, and the time varying signal decreases in frequency as the voltage of the load battery increases.

\* \* \* \* \*